United States Patent [19]

Roberts

[11] Patent Number: 5,052,890

[45] Date of Patent: Oct. 1, 1991

[54] DEVICE FOR DAMPING VIBRATIONS IN TURBOMACHINERY BLADES

[75] Inventor: Michael C. Roberts, Bristol, England

[73] Assignee: Rolls-Royce plc, London, England

[21] Appl. No.: 481,193

[22] Filed: Feb. 20, 1990

[30] Foreign Application Priority Data

Feb. 23, 1989 [GB] United Kingdom ............. 8904132.1

[51] Int. Cl.⁵ ................................................. F01D 5/10
[52] U.S. Cl. ................................. 416/193 A; 416/500
[58] Field of Search .......... 416/193 A, 204 A, 219 R, 416/220 R, 500

[56] References Cited

U.S. PATENT DOCUMENTS

| | | | |
|---|---|---|---|
| 3,887,298 | 6/1975 | Hess et al. | 416/193 X |
| 4,088,421 | 5/1978 | Hoeft | 416/193 X |
| 4,101,245 | 7/1978 | Hess et al. | 416/193 A |
| 4,182,598 | 1/1980 | Nelson | 416/193 A |
| 4,192,633 | 3/1980 | Herzner | 416/193 A |
| 4,347,040 | 8/1982 | Jones et al. | 416/500 |
| 4,355,957 | 10/1982 | Sifford et al. | 416/500 |
| 4,455,122 | 6/1984 | Schwarzmann et al. | 416/193 A |
| 4,568,247 | 2/1986 | Jones et al. | 416/193 A |

Primary Examiner—Edward K. Look
Assistant Examiner—James A. Larson
Attorney, Agent, or Firm—Oliff & Berridge

[57] ABSTRACT

In a gas turbine engine, a turbine blade vibration damper is located between the underside of a blade platform and a turbine disc, and comprises a member which extends axially parallel to the blade roots. The member has on its outer surface an inverted "V" shaped projection which engages a complementary shaped recess in the underside of the blade platforms. The member has two limbs of unequal length. Centrifugal forces on the longer limb rocks the member and urges the shorter limb into engagement with the disc rim.

4 Claims, 3 Drawing Sheets

DEVICE FOR DAMPING VIBRATIONS IN TURBOMACHINERY BLADES

BACKGROUND OF THE INVENTION

1. Field of the Invention

This invention relates to blades for use in turbomachines such as aircraft turboengines, and in particular is concerned with damping vibrations occurring in such blades during engine operation.

2. Description of the Related Art

With large compressor blades, for example fan blades of a by-pass gas turbine engine, it is known to utilise secondary platforms, commonly called snubbers, at locations along the aerofoil portion of the blade to damp vibrations caused by twisting, flutter and flapping of the blade. Snubbers on adjacent blades interact with each other so as to form in effect a continuous platform which damps the vibrations. It will be appreciated that snubbers add undesirable weight to rotating parts, and that the blade roots and the discs or drums on which the blades are mounted have to be considerably strengthened to withstand the resultant high centrifugal forces when the turbine is in use. The manufacturing and machining processes are made more complex by the presence of snubbers, and snubbers furthermore compromise the aerodynamic efficiency of the blades and introduce highly stressed zones at vulnerable regions of the blades.

It is also known to provide turbine blades with tip shrouds which serve both to minimise gas leakages at the blade tips and to provide damping of vibrations of the blades in much the same manner that snubbers do on compressor blades. Here again, turbine rotor assemblies embodying blades with tip shrouds suffer from many of the disadvantages of snubbers outlined above.

It is also known to damp shroudless blades by locating resilient blocks under the blade root platforms, but this requires a larger chord blade to obtain sufficient flexure to enable damping to be effective. This in turn results in increased disc run loads.

Another method of damping a blade employs a closed chamber within the aerofoil portion of the blade and adjacent its tip. The chamber contains a liquid and is shaped, positioned and aligned relative to the blade so that in use the liquid is constrained to form a column which oscillates within the chamber under centrifugal loads at a natural frequency which matches, or is close to, the resonant frequency of the blade to be damped. Such a method is unattractive in view of the current trend towards monocrystalline blades. For example, the provision of a closed chamber containing a liquid within a monocrystalline turbine blade is beset with manufacturing difficulties.

SUMMARY OF THE INVENTION

It is an object of the present invention to provide a means for damping vibrations in turbomachinery blades which does not utilise snubbers, tip shrouds or other means which alters the structure or dimensions of the blades, or increases the loading on the blades.

According to the present invention there is provided in a turbine rotor assembly comprising an annular turbine disc and a plurality of turbine blades around the rim of the disc, each blade including a platform spaced radially outwardly from and parallel to the rim, a device for damping vibrations in a said blade, the device comprising, a. a first pivot means located on the underside of a said blade platform, and b. an extended damper member located between said platform and the rim, the damper member including
  i. a second pivot means engageable with the first pivot means to define a pivot point for the damper member on the underside of the platform, and
  ii. mutually opposed first and second limbs extending on either side of the second pivot means, the centre of gravity of the damper member being located in the first limb at a point offset from the radius vector between the axis of the disc and the pivot point whereby, on rotation of the disc about its axis the first limb moves outwardly under centrifugal force thereby causing the damper member to rotate about the pivot point and urge the second limb radially inwards so as to engage the rim of the disc.

BRIEF DESCRIPTION OF THE DRAWINGS

The invention will now be described by way of example with reference to FIGS. 1-5 of the accompanying non-scale diagrammatic drawings, in which.

DESCRIPTION OF THE PREFERRED EMBODIMENT

Figure 1:
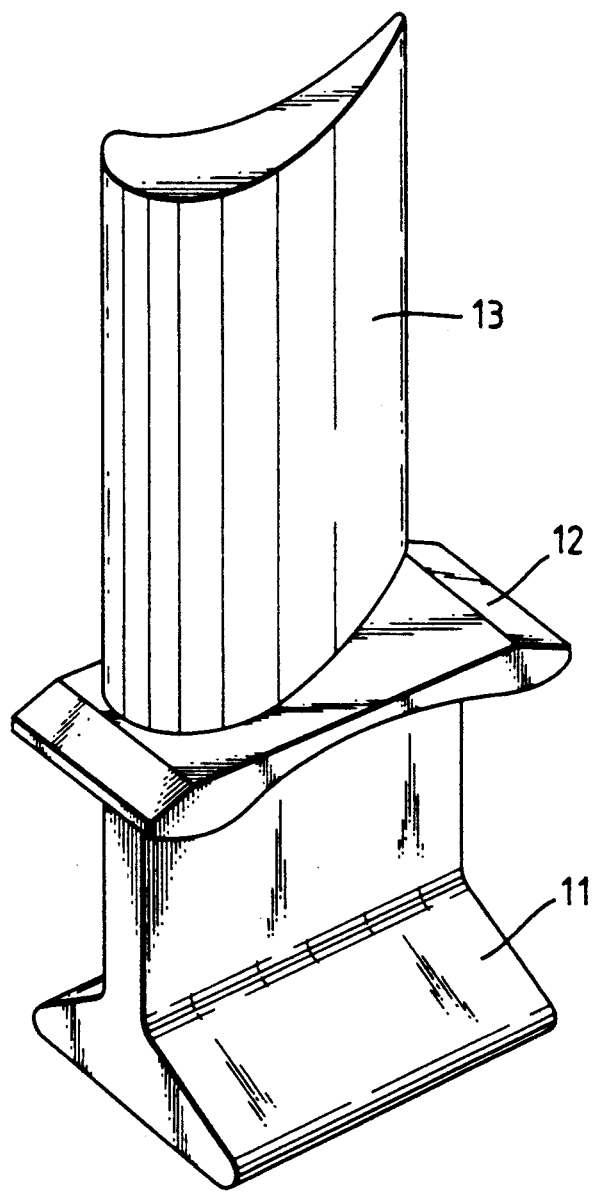
FIG. 1 is a view of a blade for a turbine or compressor rotor of a gas turbine engine.

Referring to FIG. 1 of the drawings there is shown a blade for a turbine or compressor rotor of a gas turbine engine.

The blade comprises a root portion 11, a platform 12 and an aerofoil portion 13.

The root 11 is of dovetail configuration whereby the blade may be mounted in a complementary shaped, axially extending, shaped slot in the rim of the respective compressor or turbine disc, or drum. Other shapes of root portions are possible and the slots in the disc or drum may extend axially or circumferentially.

Figure 2:
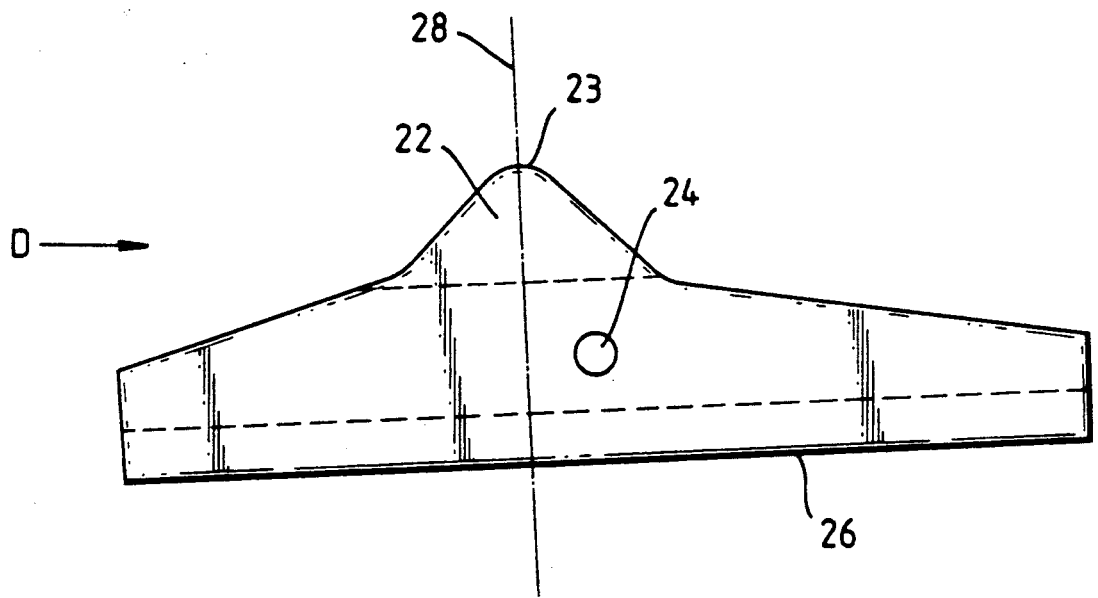
FIG. 2 is a side view of a damper member according to the invention.
Figure 3:
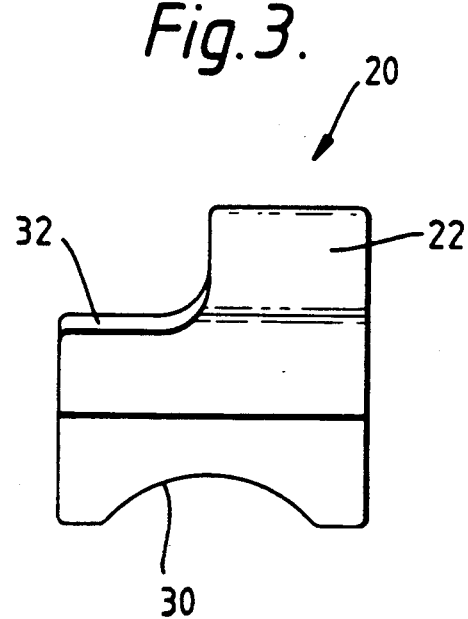
FIG. 3 is an end view of the damper member of FIG. 2, taken in the direction of arrow D of FIG. 2.

Referring to FIGS. 2 and 3 there is shown a damper member 20 for use in damping vibrations of a rotor blade in a turboengine. The damper 20 is of generally elongate shape having a raised portion 22 on its upper surface near the lateral mid-line. The raised portion 22 is, in longitudinal cross-section, of inverted V-shape, the apex being radiused. The location of the centre of gravity of the damper 20 is indicated at 24 and is such that when the damper is lying such that its underside 26 is horizontal, the centre of gravity is substantially offset on the longitudinal axis from a perpendicular lateral plane 28 through the apex 23 of the raised portion 22.

As shown in FIG. 3, the underside of the damper 20 is provided with a longitudinal cut-out 30 so as to locate the damper when in use on the rim of a said compressor or turbine disc in the tangential (i.e. circumferential) direction. The damper 20 is further provided with a longitudinal scallop 32 alongside the raised portion 22 to prevent it from touching a rotor seal-wire or an adjacent compressor or turbine blade, when in use.

Figure 4:
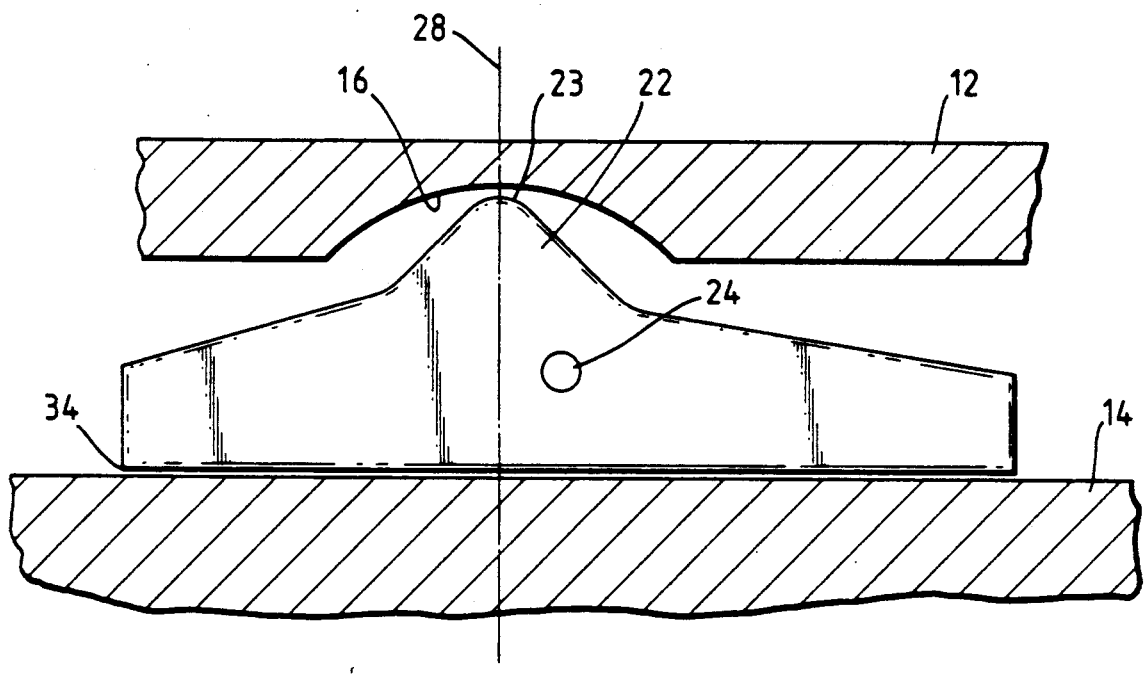
FIG. 4 is the damper member of FIG. 2 when located between a blade platform and the disc rim of a stationary turbo rotor.
Figure 5:
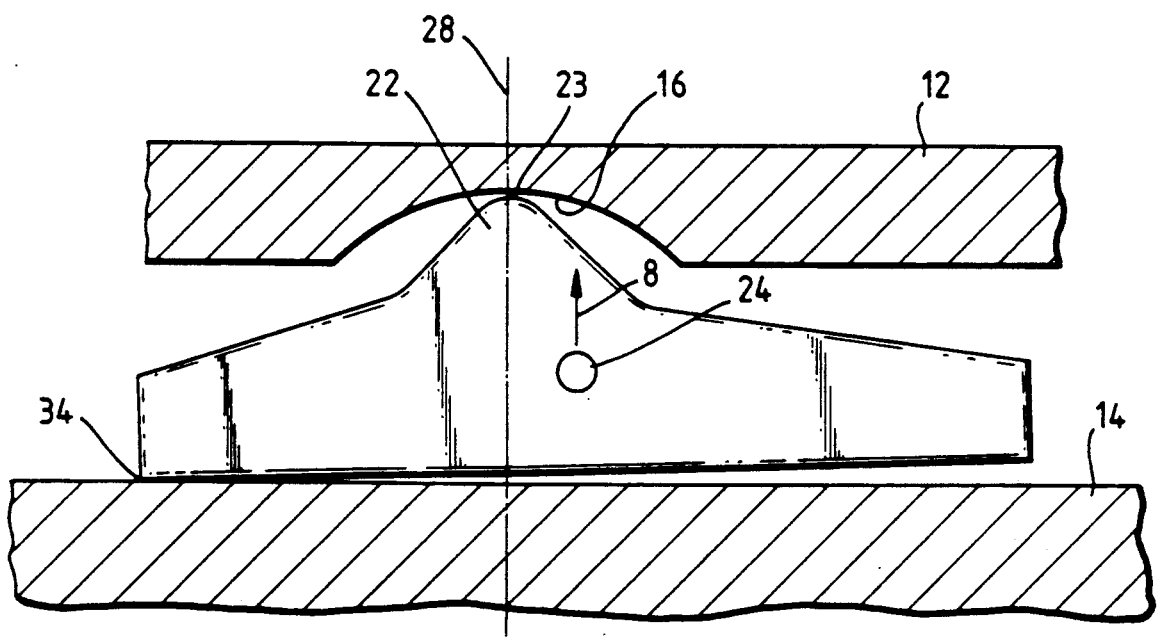
FIG. 5 shows the damper member, blade platform and disc rim of FIG. 4 when the rotor is rotating.

FIGS. 4 and 5 show the damper 20 located between a blade platform 12 and a disc rim 14. For the purposes of illustration any curvature of the blade platform or disc rim is ignored. The underside of the blade platform 12 is provided with a recess 16 complementary to the raised portion 22 of the damper 20, the structure being such that the raised portion 22 is loosely located within the recess 16 and is able to rotate therein about an axis in the plane 28. When the engine is stationary the damper 20 is subject only to gravitational forces and will take up a position accordingly. For instance, as shown in FIG. 4, the engine is stationary and the damper 20 illustrated lies flat on the uppermost portion of the disc rim 14.

When the engine rotates, the damper 20 becomes subject to centrifugal forces and its centre of gravity 24 will tend to move radially outwards in the direction of arrow 8 along an arc whose centre is near the apex 23 of the damper. The raised portion 22 of the damper 20 will therefore pivot within the recess 16 until one end 34 of the damper contacts the disc rim 14 so that the damper becomes constrained in a stable equilibrium between the disc rim and the groove.

The reaction forces between the end 34 of the damper 20 and the disc rim 14 and between the raised portion 22 and the inside of the recess 16 increase with increase in engine speed. At a critical engine speed these reaction forces are sufficiently high for the damper 20 to oscillate in sympathy with the 1F mode blade frequency, so that above this engine speed the damper attaches itself permanently to the blade platform and the disc, thus damping at least the primary oscillation frequency of the blade. On reduction of engine speed below the aforesaid critical level the damper 20 ceases to attach itself permanently to the blade platform and the disc and is now able once more to move freely in the recess.

The raised portion 22 of the damper 20 is described above as being of inverted V-shape in section. Other shapes may be contemplated, such as hemi-spherical, provided that there is provided a corresponding cooperating feature such as a hemi-spherical recess in the underside of the blade platform.

To reduce wear between the damper and the disc rim, which typically may be of the same or similar materials, those parts, i.e. end 34, of the damper which contact the disc rim, may be coated with a protective cobalt base material such as stellite.

I claim:

1. In a turbine rotor assembly comprising an annular turbine disc and a plurality of turbine blades around the rim of the disc, each blade including a platform spaced radially outwardly from and parallel to the rim, a device for damping vibrations in each of said blades, the device comprising, an extended damper member located between said platform and the rim, the damper member including
 i. a second pivot means engageable with a first pivot means located on the underside of the blade platform to define a pivot point for the damper member on the underside of the blade platform, and
 ii. mutually opposed first and second limbs extending on either side of the second pivot means,
the center of gravity of the damper member being located in the first limb at a point offset from the radius vector between the axis of rotation of the disc and the pivot point, the damping device constructed such that on rotation of the disc about its axis the first limb moves outwardly under centrifugal force thereby causing the damper member to rotate about the pivot point and urge the second limb radially inwards so as to engage the rim of the disc.

2. A device as claimed in claim 1 wherein the second pivot means is a projection on the top face of the damper member for engaging with a recess of the first pivot means so that the projection is rotatable within the recess.

3. A turbine rotor assembly comprising:
an annular turbine disc;
a plurality of turbine blades around the rim of the disc, each of said plurality of turbine blades comprising a blade platform spaced radially outwardly from and parallel to the rim, each blade platform comprising a first pivot means located on the underside thereof;
a device for damping vibrations in each of said blades comprising an extended damper member, the damper member including:
 a second pivot means engageable with the first pivot means to define a pivot point for the damper member on the underside of the blade platform; and
 mutually opposed first and second limbs extending on either side of the second pivot means, the center of gravity of the damper member offset from the radius vector between the axis of rotation of the disc and the pivot point, the damping device constructed such that on rotation of the disc about its axis the first limb moves outwardly under centrifugal force thereby causing the damper member to rotate about the pivot point and urge the second limb radially inwards so as to engage the rim of the disc.

4. A device as claimed in claim 3, wherein the first pivot means is a recess in the underside of the blade platform and the second pivot means is a projection on the top face of the damper member, the recess and the projection having complementary shapes so that the projection is rotatable within the recess.

* * * * *